3,334,081
POLYMERIZATION PROCESS
George G. Madgwick, Charleston, Richard A. Walther, St. Albans, and William J. Tabar, Charleston, W. Va., assignors to Union Carbide Corporation, a corporation of New York
No Drawing. Filed Aug. 29, 1960, Ser. No. 52,377
8 Claims. (Cl. 260—94.9)

This invention relates to the polymerization of ethylene. More particularly it is concerned with a continuous process for the production of solid polymers of ethylene as carried out in a tubular reactor, whereby the polymer is obtained at a higher conversion rate.

It is known that ethylene can be polymerized by subjecting the monomer to elevated temperatures at high pressures and preferably in contact with a catalyst, usually a free-radical catalyst; as shown, for example, in Fawcett et al. U.S. Patent No. 2,153,533, Perrin et al. U.S. Patent No. 2,188,465 and U.S. Patent No. 2,200,429, Richard et al. U.S. Patent No. 2,852,501, and many others. This high pressure, high temperature process can be carried out in a batchwise process, or in a continuous manner. The preferred procedure is the continuous process employing a tubular reactor. In this process, the catalyzed monomer mixture is introduced into the inlet end of the tubular reactor and pumped through the reactor under pressure and temperature conditions such as will promote the polymerization, and the polymer together with unreacted monomer is ejected through a suitable valve system at the other end of the tubular reactor. When operating by this process, the conversion rate is normally in the order of about 20 percent, and the solid polyethylene produced usually has a density of from about 0.910 gm./cc. to a high of 0.930 gm./cc. It is also known that the density of the polyethylene can be increased by the introduction of a chain transfer agent to the ethylene feed. However, the presence of a chain transfer agent usually results in a drastic lowering of the conversion rate to the point where conversion is only from about 40 percent to about 75 percent of the conversion obtained under similar conditions but in the absence of the chain transfer agent, corresponding to a conversion of monomer to polymer of from about 8 percent to about 15 percent or less. It is further known that polymerizable comonomers can be introduced to the ethylene feed to produce copolymers. In all instances, however, the process employed introduces the polymerizable mixture at only one point of the tubular reactor.

It has now been found that improved conversions and products are obtained when a polymerizable ethylene reaction mixture is introduced into the tubular reactor in at least two separate streams at different points along the length of the reactor. The polymerization is carried out at pressures of from about 15,000 p.s.i.g. to about 100,000 p.s.i.g., or higher, preferably from about 20,000 p.s.i.g. to about 50,000 ps.i.g.; and temperatures of from about 90° C. to about 350° C., preferably from about 150° C. to about 250° C., with the most preferred temperature range being from about 175° C. to about 225° C.

The polymerizable ethylene reaction mixture referred to is the mixture as it is present in the tubular reactor and it consists primarily of ethylene, free radical catalyst, and either a chain transfer agent or polymerizable ethylenically unsaturated monomer which undergoes addition polymerization, or both.

The process of this invention is applicable only to a continuous process carried out in a tubular reactor in which the length to diameter ratio is exceedingly high, usually greater than about 250:1 and may be as high as about 40,000:1. These tubular reactors are known to the art and no novelty is being ascribed thereto. As previously indicated, the processes heretofore employing such reactors have introduced the monomers through one end of the tubular reactor, and recovered the products from the other end thereof.

In the process of this invention, the polymerizable ethylene reaction mixture enters the tubular reactor in at least two separate streams at two separate and distinct points along the tubular reactor. The first stream is generally injected at the inlet end of the tubular reactor and is called the inlet stream. The subsequent side stream or streams are injected at side locations along the tubular reactor and are called the side stream or side streams. In many instances more than one side stream can be injected into the reactor at different points. This practice is especially desirable when one wishes to introduce more than one chain transfer agent, or more than one polymerizable ethylenically unsaturated monomer, or both a chain transfer agent and a polymerizable ethylenically unsaturated monomer, since the use of separate side streams facilitates operating procedures. It may also be desirable in some instances, however, to introduce the same mixture in two or more side streams rather than in a single side stream.

The side streams are preferably located at points from about 15 percent to about 85 percent of the distance between the point at which the inlet stream enters the tubular reactor and the discharge point at which the polymer and unreacted polymerizable ethylene reaction mixture is discharged from the tubular reactor. Generally up to about 40 percent of the total amount of polymerizable ethylene reaction mixture is added by means of the side streams, though where more than one side stream is employed, higher amounts can be introduced via the side streams.

The introduction of the polymerizable reaction mixture into the tubular reactor can be made in any manner desired. Thus, for example, one can inject ethylene alone by means of both the inlet stream and the side streams; or the inlet stream can be used to inject the ethylene while the side streams inject a mixture of ethylene and chain transfer agent, or chain transfer agent without ethylene, or a mixture of ethylene and polymerizable ethylenically unsaturated monomer which undergoes addition polymerization, or polymerizable ethylenically unsaturated monomer without ethylene; or the inlet stream can be used to inject a mixture of ethylene and chain transfer agent while the side streams inject ethylene, or a mixture of ethylene and chain transfer agent, or chain transfer agent without ethylene; or the inlet stream can be used to inject a mixture of ethylene and polymerizable ethylenically unsaturated monomer, or ethylene without polymerizable ethylenically unsaturated monomer, or polymerizable ethylenically unsaturated monomer without ethylene. As can be seen from the previous discussions, the order of injection of the streams making up the polymerizable ethylene reaction mixture can be varied widely; and as will hereinafter be shown, the order of addition, the chain transfer agent selected, and the polymerizable ethylenically unsaturated monomer selected all have an effect on the physical properties of the polymer produced.

The polymerization is carried out in the presence of a catalytic amount of a free radical catalyst, said amount being sufficient to catalyze the polymerization reaction. This amount can be varied from about 1 p.p.m. to about 10,000 p.p.m. or more, preferably from about 1 p.p.m. to about 1,000 p.p.m., and most preferably from about 2 p.p.m. to about 150 p.p.m., based on the total polymerizable ethylene reaction mixture injected to the tubular reactor. Among the free radical catalysts suitable for use are molecular oxygen, which is one of the preferred catalysts, and materials which yield active oxygen under the reaction conditions, such as peroxides. The catalysts can be used singly or in combination. Also suitable are the azo type catalysts, such as those disclosed in United States Letters Patent No. 2,471,959. Illustrative of the peroxidic free radical catalysts one can mention hydrogen peroxide, lauroyl peroxide, dipropionyl peroxide, butyryl peroxide, benzoyl peroxide, acetyl peroxide, peracetic acid, di-tertiary butyl peroxide, tertiary butyl hydroperoxide, hydroxyheptyl peroxide, acetyl benzoyl peroxide, diethyl dioxide, succinic peroxide, urea peroxide, tetralin peroxide; the alkali metal persulfates, perborates, and percarbonates; the ammonium persulfates, perborates, and percarbonates, diisopropyl peroxydicarbonate, and the like.

The catalyst can be introduced to the tubular reactor with the inlet stream, or with the side streams, or by both the inlet and side streams. When the catalyst is introduced at more than one point of the tubular reactor, higher conversions result because a larger total concentration of catalyst, based on the total polymerizable ethylene reaction mixture can be employed. Thus, for example, if oxygen is used as catalyset and all of the oxygen is introduced through the inlet in a conventional single feed reaction system, the maximum oxygen concentration that can be tolerated to give a satisfactory solid polymer useful for producing blow-molded articles is about 200 p.p.m. However, when oxygen is introduced both in the inlet and side stream, or in two or more side streams, amounts up to about 350 p.p.m. can be used. The introduction of the catalyst at two or more points in the reactor enables one to use a total amount greater than could be employed if the catalyst was introduced at one point only, while at the same time producing resins having at least equivalent properties. It has been found that the larger amounts of catalyst that can be employed by the process of this invention often lead to explosive decompositions when introduced solely through the inlet feed stream.

Among the chain transfer agents which can be used in this invention are the saturated aliphatic alcohols containing from 1 to about 10 carbon atoms, with the primary and secondary alcohols containing from about 3 to about 5 carbon atoms most preferred. Illustrative thereof one can mention methanol, ethanol, propanol, isopropanol, n-butanol, iso-butanol, sec.-butanol, pentanol, 3-methylbutanol-1, hexanol, octanol, decanol, and the like.

The saturated alcohols can be introduced into the tubular reactor in the processes of this invention via the inlet stream, via the side streams, or via both the inlet and side streams. When the alcohol is introduced to the reactor via the inlet stream only in the process of this invention, the concentration of alcohol in the polymerizable ethylene reaction mixture can be varied from about 0.2 to about 6 mole percent, based on the total ethylene flow to the reactor; and it is introduced via the inlet as a mixture with ethylene. When the alcohol at any time is introduced via a side stream it can be introduced undiluted or as a mixture with ethylene and it is introduced at such amounts that it can be present in the polymerizable ethylene reaction mixture at a total concentration of from about 0.2 to about 10 mole percent saturated aliphatic alcohol, based on the total ethylene flow to the reactor. When introduced via both the inlet stream and side streams not more than about 6 mole percent is introduced via the inlet stream and the balance, which can be sufficient to make a total up to about 10 mole percent, based on the total flow of ethylene to the reactor, can be introduced via the side streams. Thus, it was found that when all or some of the saturated aliphatic alcohol was introduced via the side streams, a much higher total concentration, up to a total of about 10 mole percent of the total ethylene flow, could be tolerated by the reaction than when all of the saturated aliphatic alcohol was introduced via the inlet stream alone. The use of the saturated aliphatic alcohols as chain transfer agents in the processes of this invention produces resins of higher densities and better film optical properties. These resins are attained at higher conversion rates than are attainable by the conventional processes in which all of the reactants are introduced at one point in the tubular reactor.

Another group of chain transfer agents useful in this invetntion is the saturated aliphatic ketones containing from 3 to about 10 carbon atoms, preferably from 3 to about 5 carbon atoms. Illustrative thereof one can mention acetone, diethyl ketone, diamyl ketone, diisobutyl ketone, methyl ethyl ketone, methyl isopropyl ketone, ethyl butyl ketone, methyl sec.-butyl ketone, ethyl propyl ketone, diisoamyl ketone, methyl n-hexyl ketone, and the like.

When, in the processes of this invention, the ketone is introduced to the tubular reactor via the inlet stream only, its concentration in the polymerizable ethylene reaction mixture can be varied from about 0.05 to about 6 mole percent, preferably from about 0.05 to about 2.5 mole percent, and most preferably from about 0.1 to about 1.5 mole percent, based on the total ethylene flow to the reactor; and it is introduced via the inlet in admixture with ethylene. When the ketone at any time is introduced via a side stream, it can be introduced undiluted or as a mixture with ethylene, and it is introduced in such amounts that it can be present in the polymerizable ethylene reaction mixture at a total concentration of from about 0.05 to about 10 mole percent, based on the total ethylene flow to the reaction. When introduced via both the inlet stream and side streams, not more than about 6 mole percent of the ketone is introduced via the inlet stream and the balance, which can be sufficient to make a total up to about 10 mole percent, based on the total flow of ethylene to the reactor, can be introduced via the side streams. Again, as in the case of the saturated aliphatic alcohols, a much higher concentration of ketone can be used when some or all of the ketone is introduced via the side streams; and conversion and physical properties also show distinct advantages. The concentration of ketone charged is dependent to some extent on the particular ketone selected, and it is well known in the art that the structure of the ketone has a decided effect on the polymer produced.

A third group of chain transfer agents useful in this invention is the saturated aliphatic aldehydes containing from 1 to about 8 carbon atoms, preferably from about 2 to about 5 carbon atoms. Illustrative thereof one can mention formaldehyde, acetaldehyde, n-butyraldehyde, isobutyraldehyde, n-valeraldehyde, isovaleraldehyde, n-caproaldehyde, n-capryaldehyde, and the like.

The aldehyde can be introduced, in the process of this invention, via the inlet stream only and its concentration in the polymerizable ethylene reaction mixture can vary from about 0.02 to about 5 mole percent, preferably from about 0.1 to about 3 mole percent, based on the total ethylene flow to the reactor; and it is introduced via the inlet in admixture with ethylene. When at any time the aldehyde is introduced via a side stream, it can be introduced either undiluted or in admixture with ethylene, and it is introduced in such amounts that it can be present in the polymerizable ethylene reaction mixture at a total concentration of from about 0.02 to about 10 mole percent, based on the total ethylene flow to the reactor. When the aldehyde is introduced via both the inlet stream and side streams, not more than about 5 mole percent is introduced via the inlet stream and the balance, which can be sufficient to make a total up to about 10 mole percent, based on the total flow of ethylene to the reactor, can be introduced via the side streams. It now becomes possible, by the processes of this invention, to introduce a much higher concentration of aldehyde to the reaction and still produce a satisfactory solid polymer.

A still further group of chain transfer agents useful in this invention is the alpha olefins containing from 3 to about 18 carbon atoms, preferably from 3 to about 6 carbon atoms. Illustrative thereof one can mention propylene, butene-1, hexene-1, 3-methylbutene-1, 4-methylpentene-1, 3,3-dimethylpentene-1, nonene-1, dedecene-1, octadecene-1, and the like.

When, in the processes of this invention, the alpha olefine is introduced to the tubular reactor via the inlet stream only, its concentration in the polymerizable ethylene reaction mixture can be varied from about 0.1 to about 4 mole percent, preferably from about 0.2 to about 2 mole percent, based on the total flow of ethylene to the reactor; and it is preferably introduced via the inlet in admixture with the ethylene. When the alpha olefin at any time is introduced via a side stream, it can be introduced undiluted, or as a mixture with ethylene, and it is introduced in such amounts that it can be present in the polymerizable ethylene reaction mixture at a total concentration of from about 0.1 to about 10 mole percent, based on the total ethylene flow to the reactor. When introduced via both the inlet stream and the side streams, not more than about 4 mole percent of the alpha olefin is introduced via the inlet stream and the balance, which can be sufficient to make a total of up to about 10 mole percent, based on the total flow of ethylene to the reactor, can be introduced via the side streams. The introduction of the alpha olefin chain transfer agents by the procedures of this invention permits the use of much higher concentrations in the reaction while at the same time producing solid polymers having improved physical properties. This process also results in increased conversions.

In addition to the chain transfer agents discussed above one can use any of the other known chain transfer agents, for example, the saturated hydrocarbons, acetylenic compounds, aromatic hydrocarbons, chlorinated aldehydes and hydrocarbons, and the like.

The process of this invention can also be used to produce copolymers of ethylene with one or more polymerizable ethylenically unsaturated monomers having a $CH_2=C<$ group and which undergo addition polymerization. These copolymers can be produced with or without a chain transfer agent present.

Polymerizable ethylenically unsaturated monomers which have a $CH_2=C<$ group and which undergo addition polymerization by the process of this invention include the acrylyl and alkacrylyl compounds, for example, the acrylic, haloacrylic, and methacrylic acids, esters, nitriles, and amides, as illustrated by acrylic acid, chloroacrylic acid, methacrylic acid, methyl acrylate, ethyl acrylate, cyanoethoxyethyl acrylate, cyanoethyl acrylate, butyl acrylate, 2-ethylhexyl acrylate, methyl chloroacrylate, methyl methacrylate, ethyl methacrylate, butyl methacrylate, octyl methacrylate, cyclohexyl methacrylate, methoxymethyl methacrylate, n-butoxyethyl methacrylate, n-butoxyethoxyethyl methacrylate, chloroethyl methacrylate, ethylene glycol diamethacrylate, diethylene glycol diacrylate, acrylonitrile, chloroacrylonitrile, methacrylonitrile, acrylamide, chloroacrylamide, methacrylamide, N - methylacrylamide, N - ethylmethacrylamide, N,N-diethylacrylamide, beta-diethylaminoethyl methacrylate, and the like; the vinyl and vinylidene halides, as illustrated by vinyl chloride, vinyl fluoride, vinylidene chloride, vinylidene fluoride, 1-chloro-1-fluoroethylene, and the like; the vinyl carboxylates, as illustrated by vinyl acetate, vinyl propionate, vinyl butyrate, vinyl crotonate, vinyl isobutyrate, vinyl thioacetate, vinyl benzoate, vinyl chloroacetate, vinyl dimethylacetate, vinyl trimethylacetate, vinyl hexanoate, vinyl stearate, vinyl laurate, and the like; the N-vinyl imides, as illustrated by N-vinylphthalimide, N-vinylsuccinimide, and the like; the N-vinyl lactams, as illustrated by N-vinylcaprolactam, N-vinylbutyrolactam, and the like; the N-vinyl aryls, such as styrene, alpha-chlorostyrene, vinylnaphthalene, and the like; the vinyl ethers, as illustrated by vinyl methyl ether, vinyl butyl ether, vinyl phenyl ether, and the like; the vinyl ketones, as illustrated by vinyl methyl ketone, vinyl ethyl ketone, ethyl isopropenyl ketone, vinyl 2-ethylhexyl ketone, vinyl phenyl ketone, and the like; and other vinyl compounds, such as vinyl pyridine, divinyl sulfone, methyl vinyl sulfone, vinyl carbazole, vinyl sulfonic esters, sodium vinyl sulfonate, and the like.

The polymerizable ethylenically unsaturated monomer can be charged to the polymerizable ethylene reaction mixture at concentrations varying from about 0.1 to about 95 mole percent, based on the total ethylene flow to the reactor, preferably from about 0.2 to about 50 mole percent, and most preferably from about 0.5 to about 10 mole percent. The polymerizable ethylenically unsaturated monomer can be introduced via the inlet stream together with the ethylene, via the side streams either undiluted or in admixture with ethylene, or via both the inlet and side streams.

It has also been found that the processes of this invention can be used to produce copolymers of ethylene with carbon monoxide, in which the carbon monoxide charged can vary from about 0.1 to about 20 mole percent, based on the total flow of ethylene to the reactor. Furthermore, this process can be used to produce polymers in which sulfur dioxide is interreacted with ethylene.

The processes of this invention can also be used to produce telomers by reacting ethylene with a telogen. This telomerization reaction is well known and has been defined in United States Letters Patent No. 2,440,800. Among some of the telogens which can be used and which have been disclosed in previously issued United States patents, one can mention carbon tetrachloride, chloroform, the saturated ethers, acids, esters, anhydrides, acetals, etc., as disclosed, for example, in United States Lettehs Patent No. 2,457,229.

Accordingly, the term polymer as used in this application and in the claims is intended to include the chain transfer agent modified ethylene resins, the ethylene interpolymers produced both in the presence of or in the absence of a chain terminating agent, and the telomers produced by the processes of this invention.

The purity of the ethylene suitable for use in the processes of this invention can be varied widely. Commercially available ethylene can be used, which generally varies in purity from about 90 to about 99.5 percent ethylene. The other gases generally found in small amounts in commercial ethylene are acetylene, butylene, ethane, propane, and the like. In most cases these impurities are present at a total concentration of less than about 5 percent.

In the following examples, which are not to be construed as limiting this invention in any manner, the physical properties of the polymers produced were determined using the following test procedures:

Melt index—A.S.T.M. D1238–52T.
Density—Hunter and Oaks, Trans. Faraday Soc. 41, 49.
Film gloss—A.S.T.M. D523–53T.
Film haze—A.S.T.M. D1003–59T.
Film see-through—Similar to process described in A.S.T.M. D1003–52 on a 1.5-mil film, but measuring ±0.07 degree deviation of the incident beam instead of ±1.3 degrees. Below 10 percent the see-through is given in feet, the numbers in feet being approximately equivalent to those in percent. The see-through value in feet is obtained using a standard AMA eye chart having the 20/30 vision line illuminated by a 200 watt silver tipped bulb connected with a reflector and mounted 3 feet in front and 3 feet above the chart.
Stiffness—A.S.T.M. D638–56T.
Yield point—A.S.T.M. D638–56T.
Ultimate tensile strength—A.S.T.M. D638–56T.
Elongation—A.S.T.M. D638–56T.
Flow ratio—This is the ratio of the melt index determined at 440 p.s.i.g. to that determined at 44 p.s.i.g.

In the experiments, the conventional process in which homopolymeric polyethylene is produced is illustrated by Experiment A. Experiment B describes the production of homopolymer using two feed points to the reactor. Experiments C to F, inclusive, illustrate the production of polyethylene in the presence of a chain transfer agent, with all of the ingredients being charged to the reactor through one feed point as a single inlet stream, a procedure well known in the art. Experiments G to I, inclusive, illustrate the production of copolymers using a single feed stream, as is known in the art. These experiments, A to I, serve as control experiments for the examples operated by the processes of this invention.

the side stream (II) was injected into the reactor by means of a second pump to a point on the side of the reactor located 36 feet from the inlet; the entire length of the reactor was 84 feet. The polymerizations were carried out at pressures of about 30,000 p.s.i.g. and temperatures of from about 180° C. to about 190° C. using oxygen as catalyst. The percent ethylene, based on the total ethylene flow to the reactor, injected via the side stream was varied from about 20 percent to about 50 percent by weight. The results are tabulated below:

|  | Run | | | | | | |
|---|---|---|---|---|---|---|---|
|  | a | b | c | d | e | f | g |
| Temperature, ° C | 185 | 185 | 187 | 187 | 185 | 183 | 184 |
| Pressure, p.s.i.g.×10⁻³ | 28 | 30 | 29 | 29 | 28 | 29 | 29 |
| Catalyst, oxygen, p.p.m. | 183 | 180 | 315 | 256 | 298 | 188 | 166 |
| Ethylene flow, lb./hr.: | | | | | | | |
| Inlet stream (I) | 36 | 24 | 22 | 21 | 20 | 22 | 20 |
| Side stream (II) | 11 | 11 | 11 | 11 | 15 | 20 | 20 |
| Percent of total ethylene flow introduced via side stream | 23 | 31.5 | 32.5 | 33.5 | 43 | 45.5 | 50 |
| Conversion, percent | 22.9 | 24.0 | 28.8 | 26.6 | 25.8 | 24.2 | 20.4 |
| Melt index, dg./min | 0.15 | 1.8 | 2.27 | 1.68 | 2.0 | 0.09 | 0.07 |
| Density, g./cc | 0.9206 | 0.919 | 0.9191 | 0.9193 | 0.9194 | 0.9195 | 0.9217 |
| Film haze, percent | | 25 | | | | | |
| Film gloss, percent | | 85 | | | | | |
| Stiffness, p.s.i.×10⁻³ | | 26 | | | | | |
| Flow ratio | 196 | | 72 | 77 | 63 | 221 | 189 |

EXPERIMENT A

In this series of experiments, a mixture of ethylene and catalyst was compressed to about 30,000 p.s.i.g. This mixture was then introduced to a jacketed tubular reactor about 60 feet long via the inlet valve at one end of the reactor and pumped through the reactor at a pressure of about 30,000 p.s.i.g. in the reactor, and a jacket temperature as indicated below. After passing through the reactor the mixture of polymer and unreacted monomer was discharged through a suitable control valve to a heated separating vessel where the polymer was separated and the unreacted ethylene was recovered for recycling. The molten polyethylene was extruded into a water bath and recovered. The results are tabulated below:

|  | Run | | | |
|---|---|---|---|---|
|  | a | b | c | d |
| Temperature, ° C | 160 | 185 | 184 | 183 |
| Pressure, p.s.i.g.×10⁻³ | 30 | 30 | 30 | 30 |
| Catalyst, p.p.m.: | | | | |
| Oxygen | | | 150 | 152 |
| Dipropionyl peroxide | 80 | 177 | | |
| Ethylene flow, lb./hr | 28 | 28 | 28 | 28 |
| Conversion, percent | 10.1 | 12.8 | 18.8 | 17.6 |
| Melt index, dg./min | 0.26 | 2.7 | 0.26 | 0.37 |
| Density, g./cc | 0.931 | 0.9313 | 0.9207 | 0.9205 |
| Film haze, percent | 64 | 50 | | |
| Film gloss, percent | 19 | 26 | | |
| Stiffness, p.s.i.×10⁻³ | 44 | | | |
| Flow ratio | | | 90 | 94 |

EXPERIMENT B

In this series of experiments, a mixture of ethylene and catalyst was compressed to about 30,000 p.s.i.g. This mixture was then fed into a jacketed tubular reactor in two separate streams. The first stream (I) was injected at the inlet end of the reactor by means of a suitable pump and

EXPERIMENT C

In this series of experiments, a mixture of ethylene, saturated aliphatic alcohol as chain transfer agent, and catalyst, was compressed to about 30,000 p.s.i.g. The mixture was then polymerized in a tubular reactor about 60 feet in length in the conventional manner similar to that described in Experiment A.

The results are tabulated below:

|  | Run | | | |
|---|---|---|---|---|
|  | a | b | c | d |
| Temperature, ° C | 185 | 185 | 185 | 185 |
| Pressure, p.s.i.g.×10⁻³ | 30 | 30 | 30 | 30 |
| Catalyst, p.p.m.: | | | | |
| Oxygen | 79 | 87 | | 60 |
| Dipropionyl peroxide | | | 95 | |
| Ethylene flow, lb./hr | 28 | 28 | 28 | 28 |
| Chain transfer agent, mole percent: | | | | |
| Isopropanol | 1.61 | 1.4 | 1.6 | |
| 2-butanol | | | | 1.6 |
| Conversion, percent | 17.2 | 21.0 | 15.0 | 16.0 |
| Melt index, dg./min | 2.5 | 1.1 | 1.3 | 2.5 |
| Density, g./cc | 0.9266 | 0.9269 | 0.9323 | 0.928 |
| Film haze, percent | 22 | 19 | 45 | 15 |
| Film gloss, percent | 46 | 61 | 23 | 80 |
| Film see-through, percent | | 5 | | |
| Stiffness, p.s.i.×10⁻³ | | | | 34 |

EXPERIMENT D

In this series of experiments, a mixture of ethylene, saturated aliphatic ketone as chain transfer agent, and catalyst was compressed to about 30,000 p.s.i.g. The mixture was then polymerized in a tubular reactor about 450 feet long in the conventional manner similar to that described in Experiment A. The results are indicated below:

|  | Run | | | | |
|---|---|---|---|---|---|
|  | a | b | c | d | e |
| Temperature | 175 | 175 | 175 | 175 | 175 |
| Pressure, p.s.i.g.×10⁻³ | 30 | 30 | 30 | 30 | 30 |
| Catalyst, p.p.m.: | | | | | |
| Oxygen | 20 | 34 | | 142 | 63 |
| Lauroyl peroxide | | | 52 | | |
| Ethylene flow, lb./hr | 1,800 | 1,800 | 1,800 | 2,000 | 1,800 |
| Chain transfer agent, mole percent: | | | | | |
| Acetone | 1.0 | 1.5 | 1.6 | | |
| Diethyl Ketone | | | | 0.16 | 0.601 |
| Melt index, dg./min | 2.6 | 11.5 | 1.2 | 4.76 | 39.3 |
| Density, g./cc | 0.925 | 0.927 | 0.936 | 0.918 | 0.932 |

EXPERIMENT E

In this series of experiments, a mixture of ethylene, saturated aliphatic aldeyhyde as chain transfer agent, and catalyst was compressed to about 30,000 p.s.i.g. The mixture was then polymerized in a tubular reactor about 60 feet long in the conventional manner similar to that described in Experiment A. The results are tabulated below.

EXPERIMENTS G, H, AND I

In this series of experiments copolymers were produced by the conventional procedure of injecting all of the materials via a single inlet stream. A mixture of ethylene, comonomer, and catalyst was compressed to about 30,000 p.s.i.g. The mixture was then polymerized in a tubular reactor about 60 feet long in a manner similar to that described in Experiment A. The results are tabulated below:

|  | Experiment | | | | | |
|---|---|---|---|---|---|---|
|  | G | G | H | H | I | I |
|  | Run | | | | | |
|  | a | b | a | b | a | b |
| Temperature, °C | 185 | 185 | 185 | 185 | 185 | 185 |
| Pressure, p.s.i.g.×10⁻³ | 30 | 30 | 30 | 30 | 30 | 30 |
| Catalyst, oxygen, p.p.m | 139 | 155 | 91 | 26 | 214 | 218 |
| Ethylene flow, lb./hr | 28 | 28 | 28 | 28 | 28 | 28 |
| Comonomer, mole percent in feed: | | | | | | |
| Ethyl acrylate | 1.4 | 2.1 | | | | |
| Vinyl acetate | | | 4.3 | 5.2 | | |
| Carbon monoxide | | | | | 1.0 | 2.3 |
| Conversion, percent | 17.2 | 19.7 | 16.7 | 21.0 | 24.0 | 17.9 |
| Melt index, dg./min | 2.5 | 5.7 | 3.5 | 36.5 | 31.0 | 1.8 |
| Comonomer, mole percent in polymer | 4 | 8.1 | 4 | 5 | 3.3 | 12.2 |
| Stiffness, p.s.i.g.×10⁻³ | 1.3 | 1 | 7.3 | 5.2 | 16 | 22 |
| Ultimate Tensile strenght, p.s.i | 660 | 340 | 2,375 | 865 | 1,065 | 1,320 |
| Yield point, p.s.i | 500 | | 920 | 740 | 1,220 | 1,430 |
| Elongation, percent | 750 | 522 | 1,120 | 565 | 145 | 360 |

|  | Run | | |
|---|---|---|---|
|  | a | b | c |
| Temperature, °C | 185 | 185 | 185 |
| Pressure, p.s.i.g.×10⁻³ | 30 | 30 | 30 |
| Catalyst, oxygen, p.p.m | 134 | 113 | 158 |
| Ethylene flow, lb./hr | 28 | 28 | 28 |
| Chain transfer agent, mole percent: Acetaldehyde | 0.1 | 0.12 | 0.12 |
| Conversion, percent | 23.2 | 20.9 | 22.4 |
| Melt index, dg./min | 1.3 | 1.8 | 4.8 |
| Density, g./cc | 0.9200 | 0.9240 | 0.9230 |
| Film haze, percent | 20.8 | 8.1 | 16.6 |
| Film gloss, percent | 59 | 99 | 71 |

EXPERIMENT F

In this series of experiments, a mixture of ethylene, an alpha olefin as chain transfer agent, and catalyst was compressed to about 30,000 p.s.i.g. The mixture was then polymerized in a tubular reactor in a manner similar to that described in Experiment A. The reactor used in Runs (a) and (b) was about 450 feet long, and the reactor used in Run (c) was about 60 feet long. The results are tabulated below:

|  | Run | | |
|---|---|---|---|
|  | a | b | c |
| Temperature, °C | 178 | 180 | 175 |
| Pressure, p.s.i.g.×10⁻³ | 31 | 32 | 30 |
| Catalyst, oxygen, p.p.m | 130 | 79 | 50 |
| Ethylene flow, lb./hr | 2,000 | 2,000 | 30 |
| Chain transfer agent, mole percent: | | | |
| Nonene | 0.27 | | |
| Propylene | | 1.0 | |
| Octadecene | | | 0.1 |
| Conversion, percent | 9.0 | 9.15 | |
| Melt index, dg./min | 3.1 | 2.74 | 3.82 |
| Density, g./cc | 0.9255 | 0.9192 | 0.9169 |
| Film haze, percent | | 6.4 | |

The following examples were carried out by the processes of this invention, by which the reactants are introduced into the tubular reactor in at least two separate streams located at different points on the reactor.

Example 1

Through the inlet of a tubular reactor about 84 feet long was fed a mixture of ethylene containing 1.1 mole percent of isopropanol as chain transfer agent and 90 p.p.m. of oxygen as catalyst, based on the total flow of ethylene to the reactor. The ethylene flow of this inlet stream was 28 pounds an hour. At a point in the side of the tubular reactor 36 feet from the inlet, a second stream was injected into the reactor at a rate of 12 pounds an hour. This second stream was a mixture of ethylene containing 90 p.p.m. of oxygen as catalyst. The pressure in the reactor was maintained at 30,000 p.s.i.g. and the temperature at 185° C. After passing through the reactor, the polymer was recovered using the recovery procedure described in United States Patent No. 2,831,845. Conversion was 18.4 percent to a polymer having a melt index of 5.8 dg./min. and a density of 0.9300 g./cc.

Examples 2 to 16

In a manner similar to that described in Example 1, a series of examples was carried out in which the amount of ethylene injected via the side stream and the amount of isopropanol present in the polymerizable reaction mixture were varied. The data from Examples 1 to 16 is tabulated below:

|  | Example | | | | | | | |
|---|---|---|---|---|---|---|---|---|
|  | 1 | 2 | 3 | 4 | 5 | 6 | 7 | 8 |
| Inlet Stream: | | | | | | | | |
| Catalyst, p.p.m.[2], Oxygen | 90 | 134 | 120 | 120 | 123 | 121 | 122 | 122 |
| Ethylene, lb./hr | 28 | 25 | 26 | 26 | 20 | 20 | 27 | 27 |
| Isopropanol, mole percent [2] | 1.1 | 0.7 | 1.5 | 1.5 | 0.07 | 1.6 | 1.7 | 2.9 |
| Side Stream: | | | | | | | | |
| Catalyst, p.p.m.:[2] | | | | | | | | |
| Oxygen | 90 | 134 | 120 | 120 | 123 | 121 | 122 | 122 |
| Dipropionyl peroxide | | | | | | | | |
| Ethylene, lb./hr | 12 | 8 | 9 | 9 | 15 | 15 | 8 | 8 |
| Percent of total ethylene via side stream | 30 | 24 | 26 | 26 | 43 | 43 | 23 | 23 |
| Conversion, percent | 18.4 | 18.9 | 29.2 | 28.7 | 22.2 | 28.0 | 24.7 | 24.5 |
| Melt index, dg./min | 5.8 | 0.15 | 23 | 13 | 2.9 | 14 | 26 | 34 |
| Density, g./cc | 0.9300 | 0.9241 | 0.9251 | 0.9262 | 0.9237 | 0.9261 | 0.9247 | 0.9303 |
| Film haze, percent | 11 | | | | | | | |
| Film gloss, percent | 81 | | | | | | | |
| Film see-through, percent | 23 | | | | | | | |
| Flow ratio | 45 | 117 | | | 45 | 33 | | |

|  | Example | | | | | | | |
|---|---|---|---|---|---|---|---|---|
|  | 9 | 10 | 11 | 12 | [1] 13 | [1] 14 | [1] 15 | [1] 16 |
| Inlet Stream: | | | | | | | | |
| Catalyst, p.p.m.,[2] Oxygen | 122 | 122 | 21 | 21 | 20 | 20 | 21 | 22 |
| Ethylene, lb./hr | 25 | 25 | 27 | 27 | 27 | 28 | 27 | 25 |
| Isopropanol, mole percent [2] | 0.7 | 2.6 | 3.0 | 2.3 | 3.8 | 0.2 | 2.3 | 2.2 |
| Side Stream: | | | | | | | | |
| Catalyst, p.p.m.:[2] | | | | | | | | |
| Oxygen | 122 | 122 | | | | | | |
| Dipropionyl peroxide | | | 78 | 120 | 40 | 30 | 55 | 70 |
| Ethylene, lb./hr | 10 | 10 | 11 | 11 | 11 | 11 | 10 | 10 |
| Percent of total ethylene via side stream | 28 | 28 | 29 | 29 | 29 | 30 | 27 | 29 |
| Conversion, percent | 25.6 | 23.9 | 12.0 | 15.5 | 13.9 | 10.3 | 12.1 | 14.6 |
| Melt index, dg./min | 1.2 | 53 | 12.8 | 6.7 | 4.2 | 5.0 | 5.5 | 4.0 |
| Density, g./cc | 0.9226 | 0.9302 | 0.9379 | 0.9353 | 0.9373 | 0.9368 | 0.9369 | 0.9358 |
| Film haze, percent | | | 17 | 14 | 6.4 | 7.7 | 7.4 | 8.8 |
| Film gloss, percent | | | 97 | 16 | 123 | 120 | 120 | 101 |
| Film see-through, percent | | | | | | | | |
| Flow ratio | 80 | | | | | | | |

[1] Reacted at 36,000 p.s.i.g.   [2] Based on total ethylene flow to reactor.

In a similar manner, the polymer is produced by the process of this invention by substitution of the following alcohols for isopropanol; namely, butanol, hexanol, 2-ethylhexanol, and decanol.

*Example 17*

Through the inlet of a tubular reactor about 480 feet long was fed a mixture of ethylene containing 1.2 mole percent of isopropanol as chain transfer agent, based on the total flow of ethylene to the reactor. The ethylene flow of this inlet stream was 1420 pounds per hour. At a point 160 feet from the inlet a second stream was injected into the reactor at a rate of 235 pounds per hour. This first side stream was a mixture of ethylene containing oxygen at a concentration of 10 p.p.m., based on the total flow of ethylene to the reactor. At a point 344 feet from the inlet a third stream was injected into the reactor at a rate of 235 pounds an hour. This second side stream was a mixture of ethylene containing oxygen at a concentration of 13 p.p.m., based on the total flow of ethylene to the reactor. The pressure in the reactor was maintained at 40,000 p.s.i.g. and the temperature at 193° C. Conversion was 14.2 percent to a polymer having a melt index of 1.2 dg./min., a density of 0.9269 g./cc., and a film haze value of 7.5 percent.

*Example 18*

In a manner similar to that described in Example 1, and using a ractor about 480 feet long, a mixture of ethylene containing 0.45 mole percent methyl ethyl ketone as chain transfer agent and 16 p.p.m. of oxygen as catalyst, based on the total ethylene flow to the reactor, was injected into the reactor at the inlet at a rate of 1900 pounds an hour. At a point 310 feet from the inlet a second stream was injected into the reactor at a rate of 860 pounds an hour. This second stream was a mixture of ethylene containing 16 p.p.m. of oxygen, based on the total ethylene flow. The pressure in the reactor was maintained at 39,000 p.s.i.g. and the temperature at 181° C. Conversion was 9.3 percent to a polymer having a melt index of 4.4 dg./min., a density of 0.9276, and a film haze value of 7.6 percent.

*Example 19*

Using the equipment and procedure described in Example 18, a mixture of ethylene containing 0.37 mole percent methyl ethyl ketone as chain transfer agent and 10 p.p.m. of oxygen as catalyst, based on the total ethylene flow to the reactor, was injected into the reactor at the inlet at a rate of 1230 pounds an hour. At a point 310 feet from the inlet a second stream was injected into the reactor at a rate of 480 pounds an hour. This second stream was a mixture of ethylene containing 4.4 p.p.m. of t-butyl hydroperoxide and 27 p.p.m. of oxygen as catalyst, based on the total flow of ethylene to the reactor. The pressure in the reaction was maintained at 36,000 p.s.i.g. and the temperature at 192° C. The polymer had a melt index of 3.9 dg./min., a density of 0.9297 g./cc. and a film haze value of 6.5 percent.

Polymer is produced in a similar manner by the substitution of acetone, diethyl ketone, dibutyl ketone, and methyl pentyl ketone, for the methyl ethyl ketone above.

*Example 20*

Using the equipment and procedure described in Example 1, a mixture of ethylene containing 0.21 mole percent of isopentaldehyde and 55 p.p.m. oxygen, based on the total ethylene flow to the reactor, was injected into the reactor inlet at a rate of 28 pounds per hour. At a point 36 feet from the reactor inlet was injected a second stream containing 12 pounds of ethylene per hour and 55 p.p.m. oxygen, based on the total ethylene flow to the reactor. The reactor pressure was 30,000 p.s.i.g. and the temperature about 185° C. Polymer was produced at an average conversion rate of 16.0 percent, its melt index was 17 dg./min. and its density 0.9339 gm./cc.

*Example 21*

Using the equipment and procedure described in Example 18, a mixture of ethylene containing 1.1 mole percent of propylene as chain transfer agent, 0.16 mole percent of isooctane, and 9.4 p.p.m. of dipropionyl peroxide, based on the total ethylene flow to the reactor, was injected into the reactor at the inlet at a rate of 1420 pounds an hour. At a point 344 feet from the inlet a second stream was injected into the reactor at a rate of 480 pounds an hour. This side stream was a mixture of ethylene containing 0.08 mole percent of isooctane and 17.6 p.p.m. of dipropionyl peroxide, based on the total flow of ethylene to the reactor. The pressure in the reactor was maintained at 41,000 p.s.i.g. and the temperature at 151° C. The polymer had a melt index of 0.17 dg./min., a density of 0.9285 g./cc. and a fraction of the resin had a film haze value of 19.3 percent.

*Example 22*

Using the equipment and procedure described in Example 18, a mixture of ethylene containing 2.1 mole percent propylene as chain transfer agent and 13 p.p.m. of oxygen as catalyst, based on the total ethylene flow to the reactor, was injected into the reactor at the inlet at a rate of 1340 pounds an hour. At a point 344 feet from the inlet a second stream was injected into the reactor at the rate of 440 pounds an hour. This side stream was a mixture of ethylene containing 0.09 mole percent of isooctane, used as a solvent for the catalyst, and 18.8 p.p.m. of dipropionyl peroxide, based on the total flow of ethylene to the reactor. The polymerization was carried out at a pressure of 41,000 p.s.i.g. and a temperature of 150° C. The polymer had a melt index of 2.6 dg./min., a density of 0.9262 g./cc., and a film haze value of 6.6 percent.

In a similar manner polymer is produced by the substitution of butene-1, 4-methylpentene-1, dodecene-1, and octadecene-1 for propylene.

*Example 23*

Using the equipment and procedure described in Example 18, a mixture of ethylene containing 0.51 mole percent carbon monoxide and 87 p.p.m. of oxygen as catalyst, based on the total ethylene flow to the reactor, was injected into the reactor at the inlet at a rate of 1400 pounds an hour. At a point 310 feet from the inlet a second stream was injected into the reactor at a rate of 467 pounds an hour. This side stream was a mixture of ethylene containing 3.3 p.p.m. of tertiary butyl hydroperoxide as catalyst, based on the total ethylene flow to the reactor. The polymerization was carried out at a pressure of 30,000 p.s.i.g. and a temperature of 186° C. The polymer had a melt index of 20 dg./min.

*Example 24*

Using the equipment described in Example 1, a mixture of ethylene containing 86 p.p.m. of oxygen, based on the total ethylene flow to the reactor, was injected into the reactor at the inlet at a rate of 28 pounds an hour. At a point 36 feet from the inlet a second stream was injected into the reactor at a rate of 12 pounds an hour. This side stream was a mixture of ethylene containing 1 mole percent isopropanol as chain transfer agent and 86 p.p.m. of oxygen, based on the total ethylene flow to the reactor. The polymerization was carried out at a pressure of 30,000 p.s.i.g. and a temperature of 185° C. The polymer was produced at a conversion rate of 20 percent, and it had a melt index of 0.02 dgm./min. and a density of 0.9224 g./cc.

In a similar manner polymer is produced by substituting pentanol, octanol, and decanol, for the isopropanol in the side stream.

*Example 25*

Using the equipment described in Example 18, ethylene was injected into the reactor at the inlet at a rate of 1360 pounds an hour. At a point 252 feet from the inlet a second stream was injected at a rate of 450 pounds an hour. This side stream was a mixture of ethylene containing 1.7 mole percent of acetone as chain transfer agent and 14.2 p.p.m. of dipropionyl peroxide as catalyst, based on the total flow of ethylene to the reactor. The polymerization was carried out at 41,000 p.s.i.g. and a temperature of 145° C. The polymer had a melt index of 0.81 dg./min. and a density of 0.9376 g./cc.

*Example 26*

Using the equipment described in Example 18, a mixture of ethylene containing 24 p.p.m. of oxygen, based on the total ethylene flow to the reactor, was injected into the reactor at the inlet at a rate of 1910 pounds an hour. At a point 310 feet from the inlet a second stream was injected at a rate of 860 pounds an hour. This side stream was a mixture of ethylene containing 0.71 mole percent methyl ethyl ketone, as chain transfer agent and 16 p.p.m. of oxygen, based on the total ethylene flow to the reactor. The polymerization was carried out at 37,000 p.s.i.g. and a temperature of 197° C. The polymer had a melt index of 1 dg./min. and a density of 0.9249 g./cc.

Additional examples were carried out by the same procedure but using equipment similar to that described in Example 1. These examples, 27 to 32, inclusive, are tabulated below:

|  | Example | | | | | |
|---|---|---|---|---|---|---|
|  | 27 | 28 | 29 | 30 | 31 | 32 |
| Inlet Stream: | | | | | | |
|   Catalyst, p.p.m.[1] | 63 | 74 | 109 | 79 | 66 | 120 |
|   Ethylene, lb./hr | 20 | 21 | 20 | 20 | 20 | 35 |
| Side Stream: | | | | | | |
|   Catalyst, p.p.m.[1] | 63 | 74 | 190 | 79 | 66 | 120 |
|   Ethylene, lb./hr | 12 | 12 | 12 | 12 | 12 | 12 |
|   Methyl ethyl ketone, mole percent[1] | 3.4 | 3.5 | 3.5 | 3.8 | 4.05 | 4.1 |
| Percent of total ethylene via side stream | 38 | 36 | 38 | 38 | 38 | 25 |
| Side stream injection feet from inlet stream | 24 | 48 | 48 | 24 | 24 | 48 |
| Conversion, percent | 10.6 | 20.5 | 11.7 | 7.0 | 8.4 | 12.6 |
| Melt index, dg./min | 1,100 | 0.03 | 2.8 | 200 | 145 | 0.4 |
| Density, g./cc | 0.9473 | 0.9290 | 0.9294 | 0.9495 | 0.9488 | 0.9268 |
| Flow ratio |  | 262 | 76 |  |  | 118 |

[1] Based on total ethylene flow to reactor.

Examples 33 to 51

Using the equipment described in Example 1, ethylene containing the catalyst was injected into the reactor at the inlet at the rate indicated in the table. At a point 36 feet from the inlet a second stream was injected at the rate indicated in the table. This side stream was a mixture of ethylene containing acetaldehyde as chain transfer agent and catalyst, the amounts thereof based on the total flow of ethylene to the reactor. The polymerizations were carried out at 185° C. at the indicated pressures. The reaction conditions and results are tabulated below:

Example 53

Using the equipment and procedure described in Example 18, a mixture of ethylene containing 82 p.p.m. of oxygen as catalyst, based on the total ethylene flow to the reactor, was injected into the reactor at the inlet at a rate of 1395 pounds an hour. At a point 310 feet from the inlet a second stream was injected at a rate of 465 pounds an hour. This side stream was a mixture of ethylene containing 0.56 mole percent carbon monoxide and 82 p.p.m. of oxygen, based on the total ethylene flow to the reactor. The polymerization was carried out at 32,000

|  | Example |  |  |  |  |  |  |  |  |
|---|---|---|---|---|---|---|---|---|---|
|  | 33 | 34 | 35 | 36 | 37 | 38 | 39 | 40 | 41 |
| Pressure, p.s.i.g.×10$^{-3}$ | 29 | 29 | 30 | 30 | 28 | 29 | 29 | 30 | 29 |
| Inlet Stream: |  |  |  |  |  |  |  |  |  |
| Catalyst, oxygen, p.p.m.[1] | 122 | 139 | 96 | 166 | 72 | 85 | 101 | 88 | 62 |
| Ethylene, lb./hr | 28 | 28 | 28 | 29 | 30 | 29 | 27 | 28 | 29 |
| Side Stream: |  |  |  |  |  |  |  |  |  |
| Catalyst, oxygen, p.p.m.[1] | 122 | 139 | 96 | 166 | 72 | 85 | 101 | 88 | 62 |
| Ethylene, lb./hr | 12 | 12 | 7 | 12 | 12 | 12 | 7 | 12 | 12 |
| Acetaldehyde, mole percent[1] | 0.48 | 0.81 | 0.98 | 1.07 | 1.97 | 2.04 | 2.21 | 2.8 | 3.0 |
| Percent of total ethylene via side stream | 30 | 30 | 20 | 29 | 29 | 29 | 21 | 30 | 29 |
| Conversion, percent | 15.0 | 21.3 | 14.4 | 23.4 | 14.8 | 16.4 | 15.6 | 18.4 | 20.1 |
| Melt index, dg./min | 0.07 | 3.79 | 2.1 | 15.0 | 4.5 | 5.0 | 2.0 | 5.0 | 8.1 |
| Density, g./cc | 0.9219 | 0.9282 | 0.9338 | 0.9253 | 0.9379 | 0.9363 | 0.9346 | 0.9375 | 0.9380 |
| Film haze, percent |  | 37 | 24 |  | 26 | 32 |  |  |  |
| Film gloss, percent |  | 34 | 51 |  | 44. | 39 |  |  |  |
| Film see-through, percent |  |  | 3 |  |  |  |  |  |  |
| Stiffness, p.s.i.×10$^{-3}$ |  |  | 42 |  | 50 | 48 |  |  |  |
| Ultimate tensile strength, p.s.i |  |  | 1,570 |  | 1,500 | 1,445 |  |  |  |
| Yield point, p.s.i |  |  | 2,300 |  | 2,480 | 2,320 |  |  |  |
| Elongation, percent |  |  | 90 |  | 40 | 43 |  |  |  |
| Flow ratio | 665 | 57 | 91 | 38 | 87 | 52 |  |  |  |

|  | Example |  |  |  |  |  |  |  |  |  |
|---|---|---|---|---|---|---|---|---|---|---|
|  | 42 | 43 | 44 | 45 | 46 | 47 | 48 | 49 | 50 | 51 |
| Pressure, p.s.i.g.×10$^{-3}$ | 30 | 30 | 29 | 30 | 28 | 30 | 30 | 30 | 30 | 29 |
| Inlet Stream: |  |  |  |  |  |  |  |  |  |  |
| Catalyst, oxygen, p.p.m.[1] | 76 | 76 | 39 | 104 | 53 | 104 | 78 | 53 | 103 | 80 |
| Ethylene, lb./hr | 27 | 26 | 28 | 27 | 28 | 26 | 28 | 27 | 26 | 28 |
| Side Stream: |  |  |  |  |  |  |  |  |  |  |
| Catalyst, oxygen, p.p.m.[1] | 76 | 76 | 39 | 104 | 53 | 104 | 78 | 53 | 103 | 80 |
| Ethylene, lb./hr | 12 | 12 | 12 | 7 | 12 | 7 | 12 | 12 | 7 | 12 |
| Acetaldehyde, mole percent[1] | 3.3 | 3.3 | 3.8 | 3.84 | 3.9 | 4.23 | 4.3 | 5.0 | 5.41 | 5.9 |
| Percent of total ethylene via side stream | 31 | 32 | 30 | 29 | 30 | 21 | 30 | 31 | 21 | 30 |
| Conversion, percent | 17.9 | 17.6 | 9.7 | 17.5 | 15.4 | 17.7 | 13.8 | 15.7 | 16.0 | 5.3 |
| Melt index, dg./min | 1.14 | 12.9 | 1.8 | 1.2 | 0.49 | 3.2 | 4.0 | 0.93 | 1.8 | 5.7 |
| Density, g./cc | 0.9377 | 0.9415 | 0.9406 | 0.9333 | 0.9358 | 0.9350 | 0.9348 | 0.9352 | 0.9339 | 0.9350 |
| Film haze, percent |  |  |  |  |  |  |  |  | 39 |  |
| Film gloss, percent |  |  |  |  |  |  |  |  | 35 |  |
| Film see-through, percent |  |  |  |  |  |  |  |  |  |  |
| Stiffness, p.s.i.×10$^{-3}$ |  |  |  |  |  |  |  |  | 37 |  |
| Ultimate tensile strength, p.s.i |  |  |  |  |  |  |  |  | 1,435 |  |
| Yield point, p.s.i |  |  |  |  |  |  |  |  | 2,230 |  |
| Elongation, percent | 173 | 375 |  |  |  |  |  |  | 70 |  |
| Flow ratio |  |  | 193 | 88 | 134 |  | 117 | 150 | 122 | 94 |

[1] Based on total ethylene flow to reactor.

Example 52

Using the equipment and procedure described in Example 18, a mixture of ethylene containing 67 p.p.m. of oxygen as catalyst, based on the total ethylene flow to the reactor, was injected into the reactor at the inlet at a rate of 1425 pounds an hour. At a point 310 feet from the inlet a second stream was injected into the reactor at a rate of 475 pounds an hour. This side stream was a mixture of ethylene containing 1 mole percent of propylene and 22 p.p.m. of oxygen, based on the total ethylene flow to the reactor. The polymerization was carried out at a pressure of 34,000 p.s.i.g. and a temperature of 167° C. The polymer had a melt index of 6.3 dg./min.

p.s.i.g. and a temperature of 185° C. The polymer had a melt index of 2.2 dg./min.

Examples 54 to 65

Using equipment described in Example 1, a mixture of ethylene containing an alcohol as chain transfer agent and a catalyst was injected into the reactor at the inlet. At a point 36 feet from the inlet a second stream was injected. This side stream was a mixture of ethylene, alcohol, and catalyst. The polymerizations were carried out at about 30,000 p.s.i.g. and at a temperature of about 185° C. The reaction conditions and results are tabulated below:

and a catalyst was injected into the reactor at the inlet. At a point 36 feet from the inlet, except where indicated,

|  | Example | | | | | | | | | | | |
|---|---|---|---|---|---|---|---|---|---|---|---|---|
|  | 54 | 55 | 56 | 57 | 58 | 59 | 60 | 61 | 62 | 63 | 64 | 65 |
| Inlet Stream: | | | | | | | | | | | | |
| Catalyst, p.p.m.[1]: | | | | | | | | | | | | |
| Oxygen | 87 | 102 | 101 | 62 | 64 | 62 | 64 | 55 | 26 |  | 17 | 21 |
| Dipropionyl peroxide |  |  |  |  |  |  |  |  |  | 103 |  |  |
| Ethylene, lb./hr | 28 | 28 | 28 | 28 | 28 | 28 | 28 | 28 | 27 | 25 | 25 | 28 |
| Isopropanol, mole percent [1] | 1.1 | 1.0 | 1.0 | 1.5 | 1.5 | 1.3 | 2.0 | 2.0 | 2.0 | 1.0 | 0.6 | 0.8 |
| Side Stream: | | | | | | | | | | | | |
| Catalyst, p.p.m.[1]: | | | | | | | | | | | | |
| Oxygen | 87 | 102 | 101 | 62 | 64 | 62 | 64 | 55 | 26 | 38 | 38 |  |
| Dipropionyl peroxide |  |  |  |  |  |  |  |  |  |  |  | 117 |
| Ethylene, lb./hr | 12 | 12 | 11 | 12 | 11 | 12 | 12 | 11 | 11 | 11 | 11 | 11 |
| Isopropanol, mole percent [1] | 0.5 | 1.0 | 2.1 | 0.6 | 1.0 | 1.8 | 0.6 | 1.0 | 2.0 | 2.0 | 2.0 | 0.7 |
| Percent of total ethylene via side stream | 30 | 30 | 28 | 30 | 28 | 30 | 30 | 28 | 29 | 30 | 30 | 28 |
| Conversion, percent | 19.0 | 22.0 | 26.0 | 16.0 | 17.0 | 21.0 | 16.4 | 16.0 | 8.0 | 11.5 | 11.9 | 10.6 |
| Melt index, dg./min | 0.96 | 2.8 | 6.4 | 3.4 | 4.3 | 4.6 | 8.5 | 7.6 | 8.1 | 6.5 | 0.4 | 3.9 |
| Density, g./cc | 0.9280 | 0.9270 | 0.9256 | 0.9284 | 0.9294 | 0.9305 | 0.9320 | 0.9320 | 0.9346 | 0.9332 | 0.9340 | 0.9371 |
| Film haze, percent | 13 | 12 | 8 | 8 | 7 | 9 | 7 | 8 | 8 | 26 |  | 12 |
| Film gloss, percent | 80 | 84 | 101 | 104 | 112 | 104 | 118 | 117 | 126 |  |  |  |
| Film see-through, percent | 12 | 20 | 30 | 36 | 46 | 36 | 42 | 54 | 48 | 43 |  | 73 |
| Flow ratio | 67 | 50 | 44 | 39 | 42 | 46 | 38 | 38 |  |  |  |  |

[1] Based on total ethylene flow to reactor.

*Examples 66 to 79*

Using the equipment described in Example 1, except where otherwise indicated, a mixture of ethylene containing a saturated aliphatic ketone as chain transfer agent a second stream consisting of a mixture of ethylene, saturated aliphatic ketone and catalyst was injected into the reactor. The polymerization conditions and results are tabulated below:

|  | Example | | | | | | |
|---|---|---|---|---|---|---|---|
|  | [1] 66 | 67 | 68 | 69 | 70 | 71 | 72 |
| Pressure, p.s.i.g.×10⁻³ | 40 |  | 30 | 30 | 30 |  |  |
| Temperature, °C | 140 |  |  |  |  |  |  |
| Inlet Stream: | | | | | | | |
| Catalyst, p.p.m.[2]: | | | | | | | |
| Oxygen |  |  |  |  |  | 131 | 93 |
| Dipropionyl peroxide | 6.0 |  | 27 | 50 | 28 |  |  |
| Ethylene, lb./hr | 1,800 | 35 | 27 | 28 | 28 | 21 | 21 |
| Ketone, mole percent[2]: | | | | | | | |
| Diethyl ketone | 0.15 |  |  |  |  |  |  |
| Methyl ethyl ketone |  | 0.2 | 0.2 | 0.4 | 0.5 | 0.16 | 0.17 |
| Side Stream: | | | | | | | |
| Catalyst, p.p.m.[2]: | | | | | | | |
| Oxygen |  |  |  |  |  | 131 | 93 |
| Dipropionyl peroxide | 12.1 |  | 29 | 49 | 46 |  |  |
| Ethylene, lb./hr | 590 | 12 | 10 | 9 | 10 | 12 | 12 |
| Ketone, mole percent[2]: | | | | | | | |
| Diethyl ketone | 0.74 |  |  |  |  |  |  |
| Methyl ethyl ketone |  | 4.5 | 0.2 | 0.4 | 0.5 | 2.2 | 3.4 |
| Percent of total ethylene via side stream | 25 | 25 | 27 | 25 | 26 | 36 | 34 |
| Conversion, percent |  |  | 11 | 15.0 | 16.9 | 16.1 | 15.5 | 13.6 |
| Melt index, dg./min | 60 | 1.6 | 2.1 | 2.1 | 26.0 | 26.0 | 1.1 |
| Density, g./cc |  | 0.933 | 0.9353 | 0.9356 | 0.9393 | 0.9307 | 0.9302 |
| Film haze, percent |  | 11 | 29 | 29 |  |  | 23 |
| Film gloss, percent |  | 94 | 40 | 40 |  |  | 54 |
| Film see-through, percent |  |  |  |  |  |  | 4 |
| Stiffness, p.s.i.×10⁻³ |  | 46 |  |  |  |  | 40 |
| Ultimate tensile strength, p.s.i |  |  |  |  |  |  | 1,570 |
| Yield point, p.s.i |  |  |  |  |  |  | 2,030 |
| Elongation, percent |  |  |  |  |  |  | 230 |
| Flow ratio |  |  |  |  |  |  | 80 |

|  | Example ||||||| 
|---|---|---|---|---|---|---|---|
|  | 73 | 74 | 75 | 76 | 77 | 78 | 79 |
| Pressure, p.s.i.g.×10⁻³ |  |  |  |  |  |  |  |
| Temperature, °C |  |  |  |  |  |  |  |
| Inlet Stream: |  |  |  |  |  |  |  |
|   Catalyst, p.p.m.[2]: |  |  |  |  |  |  |  |
|     Oxygen | 135 | 75 | 134 | 117 | 119 | 39 | 27 |
|     Dipropionyl peroxide |  |  |  |  |  |  |  |
|   Ethylene, lb./hr | 20 | 35 | 34 | 35 | 35 | 36 | 20 |
|   Ketone, mole percent[2]: |  |  |  |  |  |  |  |
|     Diethyl ketone |  |  |  |  |  |  |  |
|     Methyl ethyl ketone | 0.2 | 0.6 | 0.3 | 0.1 | 0.1 | 0.07 | 0.11 |
| Side Stream: |  |  |  |  |  |  |  |
|   Catalyst, p.p.m.[2]: |  |  |  |  |  |  |  |
|     Oxygen | 135 | 75 | 134 | 117 | 119 | 39 | 27 |
|     Dipropionyl peroxide |  |  |  |  |  |  |  |
|   Ethylene, lb./hr | 12 | 11 | 9 | 12 | 12 | 12 | 12 |
|   Ketone, mole percent[2]: |  |  |  |  |  |  |  |
|     Diethyl ketone |  |  |  |  |  |  |  |
|     Methyl ethyl ketone | 4.2 | 4.7 | 2.3 | 5.6 | 6.7 | 4.5 | 3.9 |
| Percent of total ethylene via side stream | 37 | 24 | 21 | 25 | 25 | 25 | 37 |
| Conversion, percent | 16.8 | 11.0 | 11.9 | 8.9 | 11.6 | 7.3 | 8.5 |
| Melt index, dg./min | 6.1 | 1.6 | 0.8 | 3.8 | 22.1 | 13.5 | 26 |
| Density, g./cc | 0.9274 | 0.9330 | 0.9282 | 0.9277 | 0.9385 | 0.9406 | 0.9315 |
| Film haze, percent | 15 | 11 |  |  |  |  |  |
| Film gloss, percent | 68 | 95 |  |  |  |  |  |
| Film see-through, percent | 8 | 14 |  |  |  |  |  |
| Stiffness, p.s.i.×10⁻³ | 36 | 46 |  |  |  |  |  |
| Ultimate tensile strength, p.s.i. | 1,375 | 1,575 |  |  |  |  |  |
| Yield point, p.s.i. | 1,880 | 2,250 |  |  |  |  |  |
| Elongation, percent | 110 | 230 |  |  |  |  |  |
| Flow ratio | 49 | 80 | 104 | 43 |  |  |  |

[1] Using the equipment described in Example 18.
[2] Based on total ethylene flow to reactor.

Example 80

Using the equipment and procedure described in Example 1, a mixture of ethylene containing 0.1 mole percent isopentaldehyde and 10 p.p.m. oxygen, based on the total ethylene flow to the reactor, was injected to the inlet of an 84 foot reactor at a rate of 28 pounds per hour. At a point 36 feet from the reactor inlet was injected a second stream containing ethylene mixed with 10 p.p.m. oxygen and 0.1 mole percent isopentaldehyde, based on the total ethylene flow to the reactor; the flow rate of this second stream was 12 pounds an hour. The reactor pressure was 30,000 p.s.i.g. and the temperature about 185° C. Polymer was produced at an average conversion rate of 7.3 percent; its melt index was 4.56 dg./min. and its density 0.9360 gm./cc. Film extruded from this polymer had a haze value of 15.9 percent and a gloss of 83.5 percent.

Example 81

Using the equipment described in Example 1, a mixture of ethylene containing 0.116 mole percent methyl ethyl ketone as chain transfer agent and 33 p.p.m. of oxygen as catalyst, based on the total flow of ethylene to the reactor, was injected into the reactor at a rate of 35 pounds an hour. At a point 36 feet from the inlet a second stream was injected into the reactor at a rate of 12 pounds an hour. This side stream was a mixture of ethylene containing 2.9 mole percent acetaldehyde as chain transfer agent and 33 p.p.m. of oxygen, based on the total ethylene flow to the reactor. The polymerization was carried out at about 30,000 p.s.i.g. and at a temperature of 185° C. The polymer produced had a melt index of 6.0 dg./min., a density of 0.9473 g./cc., a film haze value of 21 percent, film gloss value of 65 percent, and a flow ratio of 97.

Examples 82 to 90

Using the equipment described in Example 1, a mixture of ethylene containing 2-butanol as chain transfer agent and oxygen was injected into the reactor at the inlet. At a point 36 feet from the inlet a second stream, a mixture of ethylene containing acetaldehyde as chain transfer agent and oxygen, was injected into the reactor. The polymerization was carried out at about 30,000 p.s.i.g. and at a temperature of about 185° C. Additional details are tabulated below:

|  | Example |||||||||
|---|---|---|---|---|---|---|---|---|---|
|  | 82 | 83 | 84 | 85 | 86 | 87 | 88 | 89 | 90 |
| Inlet stream: |  |  |  |  |  |  |  |  |  |
|   Catalyst, p.p.m.[1] | 122 | 18 | 18 | 51 | 18 | 19 |  | 71 | 33 |
|   Ethylene, lb./hr | 20 | 20 | 30 | 30 | 23 | 21 | 21 | 28 | 29 |
|   2-butanol, mole percent | 0.76 | 0.54 | 0.49 | 0.72 | 0.72 | 0.75 | 1.45 | 1.5 | 0.8 |
| Side Stream: |  |  |  |  |  |  |  |  |  |
|   Catalyst, p.p.m.[1] | 122 | 18 | 18 | 51 | 18 | 19 |  | 71 | 33 |
|   Ethylene, lb./hr | 12 | 13 | 13 | 12 | 15 | 15 | 15 | 12 | 12 |
|   Acetaldehyne, mole percent[1] | 4.4 | 4.5 | 5.8 | 4.28 | 2.65 | 4.4 | 2.7 | 3.5 | 3.0 |
| Percent of total ethylene via side stream | 38 | 39 | 30 | 29 | 39 | 42 | 42 | 30 | 29 |
| Conversion, percent | 20.9 | 6.7 | 5.8 | 8.7 | 6.5 | 6.4 | 6.3 | 13.8 | 13.9 |
| Melt index, dg./min | 66 | 14 | 92 | 56 | 17 | 11 | 18 | 17 | 58 |
| Density, g./cc | 0.9448 | 0.9429 | 0.9471 | 0.9420 | 0.9420 | 0.9418 | 0.9403 | 0.9318 | 0.9496 |

[1] Based on total ethylene flow to reactor.

Example 91

Using the equipment described in Example 18, a mixture of ethylene containing 0.2 mole percent nonene-1 as chain transfer agent and 33 p.p.m. of oxygen as catalyst, based on the total flow of ethylene to the reactor, was injected into the reactor at the inlet at a rate of 1230 pounds an hour. At a point 344 feet from the inlet a second stream was injected at the rate of 410 pounds an hour. This side stream was a mixture of ethylene containing 0.2 mole percent of nonene and 33 p.p.m. of oxygen, based on the total flow of ethylene to the reactor. The polymerization was carried out at 40,000 p.s.i.g. and a temperature of 184° C. The polymer had a melt index of 7.7 dg./min., and a density of 0.9247 g./cc.

Examples 92 to 99

Using the equipment described in Example 1, a mixture of ethylene containing ethyl acrylate as comonomer and oxygen as catalyst was injected into the reactor at the inlet. At a point 36 feet from the inlet a second stream was injected. This side stream was a mixture of ethylene, ethyl acrylate, and catalyst. The polymerizations were carried out at about 30,000 p.s.i.g. and at a temperature of about 185° C.; a copolymer of ethylene and ethyl acrylate was produced. The reaction conditions and results are tabulated below:

Examples 100 to 107

Using the equipment described in Example 1, a mixture of ethylene containing vinyl acetate as comonomer and oxygen as catalyst was injected into the reactor at the inlet. At a point 36 feet from the inlet a second stream was injected. This side stream was a mixture of ethylene, vinyl acetate, and catalyst. The polymerizations were carried out at a pressure of about 30,000 p.s.i.g and at a temperature of about 185° C.; a copolymer of ethylene and vinyl acetate was produced. The reaction conditions and results are tabulated below:

|  | Example | | | | | | | |
|---|---|---|---|---|---|---|---|---|
|  | 100 | 101 | 102 | 103 | 104 | 105 | 106 | 107 |
| Inlet Stream: | | | | | | | | |
| Catalyst, p.p.m [1] | 53 | 53 | 73 | 73 | 63 | 41 | 42 | 67 |
| Ethylene, lb./hr | 28 | 28 | 28 | 28 | 28 | 28 | 28 | 27 |
| Vinyl acetate, mole percent [1] | 4.4 | 4.6 | 6.4 | 6.5 | 9.6 | 9.8 | 10.3 | 10.2 |
| Side Stream: | | | | | | | | |
| Catalyst, p.p.m [1] | 53 | 53 | 73 | 73 | 63 | 41 | 42 | 67 |
| Ethylene, lb./hr | 12 | 12 | 12 | 13 | 12 | 12 | 11 | 10 |
| Vinyl acetate, mole percent [1] | 4.4 | 4.6 | 6.4 | 6.5 | 9.6 | 9.8 | 10.3 | 10.2 |
| Percent of total ethylene via side stream | 30 | 30 | 30 | 29 | 40 | 40 | 28 | 27 |
| Conversion, percent | 6.8 | 10.0 | 7.9 | 7.4 | 8.7 | 10.2 | 9.3 | 15.6 |
| Melt index, dg./min | 0.02 | 0.05 | 0.15 | 0.08 | 5.9 | 1.5 | 3.6 | 5.2 |
| Density, g./cc | 0.9344 | 0.9359 | 0.9380 | 0.59 | 0.9465 | 0.9465 | 0.9471 | 0.9467 |
| Vinyl acetate content, mole percent | 4.3 | 3.5 | 5.2 | 4.1 |  | 6.4 | 7.9 |  |
| Stiffness, p.s.i.×10⁻³ | 13 | 11 | 9 | 10 |  | 4 | 4 |  |
| Ultimate tensile strength, p.s.i | 3,300 | 1,090 | 2,710 | 2,675 |  | 2,040 | 1,400 |  |
| Elongation, percent | 750 | 750 | 980 | 700 |  | 839 | 680 |  |

[1] Based on total ethylene flow to reactor.

Example 108

Using the equipment described in Example 1, a mixture of ethylene containing 1 mole percent of carbon monoxide and 196 p.p.m. of oxygen, based on the total ethylene flow to the reactor, was injected into the reactor at the inlet at a rate of 28 pounds an hour. At a point 36 feet from the inlet a second stream was injected at the rate of 12 pounds an hour. This side stream was a mixture of ethylene containing 1 mole percent of carbon monoxide and 196 p.p.m. of oxygen, based on the total ethylene flow to the reactor. The polymerization was carried out at a pressure of about 30,000 p.s.i.g. and a temperature of about 185° C. The results and properties are tabulated below.

Example 109

The ethylene-carbon monoxide copolymer produced in Example 108 was produced again using a carbon monoxide concentration of 2 mole percent in both the inlet stream and side stream, and catalyst concentrations of 227 p.p.m. of oxygen. The reaction conditions were as indicated in Example 108. The results and properties are tabulated below.

|  | Example | | | | | | | |
|---|---|---|---|---|---|---|---|---|
|  | 92 | 93 | 94 | 95 | 96 | 97 | 98 | 99 |
| Inlet Stream: | | | | | | | | |
| Catalyst, p.p.m [1] | 102 | 102 | 85 | 78 | 85 | 58 | 58 | 78 |
| Ethylene, lb./hr | 28 | 28 | 28 | 28 | 28 | 27 | 27 | 28 |
| Ethyl acrylate, mole percent [1] | 1.3 | 1.5 | 1.5 | 1.6 | 1.7 | 2.0 | 2.0 | 2.2 |
| Side Stream: | | | | | | | | |
| Catalyst, p.p.m.[1] | 102 | 102 | 85 | 78 | 85 | 58 | 58 | 78 |
| Ethylene, lb./hr | 11 | 11 | 10 | 10 | 10 | 11 | 10 | 10 |
| Ethyl acrylate, mole percent [1] | 1.3 | 1.5 | 1.5 | 1.6 | 1.7 | 2.0 | 2.0 | 2.2 |
| Percent of total ethylene via side stream | 28 | 28 | 26 | 26 | 26 | 29 | 27 | 26 |
| Conversion, percent | 16.3 | 11.8 | 12.9 | 6.2 | 13.4 | 7.1 | 6.5 | 7.7 |
| Melt index, dg./min | 53 | 14 | 6.5 | 14.0 | 5.9 | 15.0 | 31.0 | 20.0 |
| Density, g./cc | 0.9345 | 0.9329 | 0.9329 | 0.9490 | 0.9342 | 0.9498 | 0.9505 | 0.9448 |
| Ethylacrylate content, mole percent | 6.8 | 8.0 | 7.2 | 14.8 | 4.3 | 14.3 | 15.3 | 12.9 |
| Stiffness, p.s.i.g.×10⁻³ | 2 | 2 | 3 |  | 2 |  |  |  |
| Ultimate tensile strength, p.s.i | 770 | 780 | 890 | 80 | 1015 | 93 | 55 | 145 |
| Yield point, p.s.i |  |  |  | 90 |  | 96 | 65 | 150 |
| Elongation, percent | 655 | 650 | 590 | 365 | 750 | 460 | 330 | 275 |

[1] Based on the total flow of ethylene to reactor.

|  | Example | |
|---|---|---|
|  | 107 | 109 |
| Conversion, percent | 12.4 | 7.4 |
| Melt index, dg./min | 0.06 | 0.58 |
| Carbon monoxide content in the polymer, mole percent | 8.2 | 21.2 |
| Stiffness, p.s.i.×10⁻³ | 28 | 28 |
| Ultimate tensile strength, p.s.i. | 1,540 | 1,320 |
| Yield point, p.s.i. | 1,650 | 1,455 |
| Elongation, percent | 235 | 84 |

What is claimed is:

1. A continuous process for the polymerization of ethylene in a tubular reactor having a length to diameter ratio greater than about 250:1 at a pressure of at least about 15,000 p.s.i.g. and a temperature of from about 90° C. to about 350° C. in the presence of a free radical catalyst to produce normally solid polymers thereof, which comprises introducing a polymerizable ethylene reaction mixture to the tubular reactor in at least two separate streams, the first stream being injected into the tubular reactor at the inlet end of the tubular reactor and the subsequent side streams being injected into the tubular reactor at side locations along the tubular reactor located at points from about 15 percent to about 85 percent of the distance between the inlet point at which the first stream is introduced and the discharge point at which the polymer and unreacted ethylene mixture is discharged from the tubular reactor, wherein said first stream is a mixture of ethylene and a chain transfer agent selected from the group consisting of a saturated alcohol containing from 1 to about 10 carbon atoms present at a concentration of from about 0.2 to about 6 mole percent, based on the total ethylene flow to the reactor, a saturated aliphatic ketone containing from 3 to about 10 carbon atoms present at a concentration of from about 0.05 to about 6 mole percent, based on the total flow of ethylene to the reactor, a saturated aliphatic aldehyde containing from 1 to about 8 carbon atoms present at a concentration of from about 0.1 about 6 mole percent, based on the total flow of ethylene to the reactor, and an alpha olefin containing from 3 to about 18 carbon atoms present at a concentration of from about 0.1 to about 4 mole percent, based on the total flow of ethylene to the reactor, and wherein said subsequent side stream injected into the tubular reactor is a mixture of ethylene and the chain transfer agents as defined above and the total concentration in the polymerizable ethylene reaction mixture of saturated aliphatic alcohol is from about 0.2 to about 10 mole percent, of saturated aliphatic ketone is from about 0.05 to about 10 mole percent, of saturated aliphatic aldehyde is from about 0.02 to about 10 mole percent, and of alpha olefin is from about 0.1 to about 10 mole percent, based on the total flow of ethylene to the reactor.

2. A continuous process for the polymerization of ethylene in a tubular reactor having a length to diameter greater than about 250.1 at a pressure of at least about 15,000 p.s.i.g. and a temperature of from about 90° C. to about 350° C. in the presence of a free radical catalyst to produce normally solid polymers thereof, which comprises introducing a polymerizable ethylene reaction mixture to the tubular reactor in at least two separate streams, the first stream being injected into the tubular reactor at the inlet end of the tubular reactor and the subsequent side streams being injected into the tubular reactor of side locations along the tubular reactor located at points from about 15 percent to about 85 percent of the distance between the inlet point at which the first stream is introduced and the discharge point at which the polymer and unreacted ethylene mixture is discharged from the tubular reactor, wherein said first stream is a mixture of ethylene and a chain transfer agent selected from the group consisting of a saturated aliphatic alcohol containing from 1 to about 10 carbon atoms present at a concentration of from about 0.2 to about 6 mole percent, based on the total ethylene flow to the reactor, a saturated aliphatic ketone containing from 3 to about 10 carbon atoms present at a concentration of from about 0.05 to about 6 mole percent, based on the total flow of ethylene to the reactor, a saturated aliphatic aldehyde containing from 1 to about 8 carbon atoms present at a concentration of from about 0.1 to about 6 mole percent, based on the total flow of ethylene to the reactor, and an alpha olefin containing from 3 to about 18 carbon atoms present at a concentration of from about 0.1 to about 4 mole percent, based on the total flow of ethylene to the reactor, and wherein said subsequent side stream injected into the tubular reactor is the chain transfer agents as defined above and the total concentration in the polymerizable ethylene reaction mixture of saturated aliphatic alcohol is from about 0.2 to about 10 mole percent, of saturated aliphatic ketone is from about 0.05 to about 10 mole percent, of saturated aliphatic aldehyde is from about 0.02 to about 10 mole percent, and of alpha olefin is from about 0.1 to about 10 mole percent, based on the total flow of ethylene to the reactor.

3. A continuous process for the polymerization of ethylene in a tubular reactor having a length to diameter ratio greater than about 250:1 at a pressure of at least about 15,000 p.s.i.g. and a temperature of from about 90° C. to about 350° C. in the presence of a free radical catalyst to produce normally solid polymers thereof, which comprises introducing a polymerizable ethylene reaction mixture to the tubular reactor in at least two separate streams, the first stream being injected into the tubular reactor at the inlet end of the tubular reactor and the subsequent side streams being injected into the tubular reactor at side locations along the tubular reactor located at points from about 15 percent to about 85 percent of the distance between the inlet point at which the first stream is introduced and the discharge point at which the polymer and unreacted ethylene mixture is discharged from the tubular reactor, wherein said first stream is ethylene, and wherein said subsequent side stream is a mixture of ethylene and a chain transfer agent selected from the group consisting of a saturated aliphatic alcohol containing from 1 to about 10 carbon atoms, a saturated aliphatic ketone containing from 3 to about 10 carbon atoms, a saturated aliphatic aldehyde containing from 1 to about 8 carbon atoms, and an alpha olefin containing from 3 to about 18 carbon atoms and the total concentration in the polymerizable ethylene reaction mixture of saturated aliphatic alcohol is from about 0.2 to about 10 mole percent, of saturated aliphatic ketone is from about 0.05 to about 10 mole percent, of saturated aliphatic aldehyde is from about 0.02 to about 10 mole percent, and of alpha olefin is from about 0.1 to about 10 mole percent, based on the total flow of ethylene to the reactor.

4. A continuous process for the polymerization of ethylene in a tubular reactor having a length to diameter ratio greater than about 250:1 at a pressure of at least about 15,000 p.s.i.g. and a temperature of from about 90° C. to about 350° C. in the presence of a free radical catalyst to produce normally solid polymers thereof, which comprises introducing a polymerizable ethylene reaction mixture to the tubular reactor in at least two separate streams, the first stream being injected into the tubular reactor at the inlet end of the tubular reactor and the subsequent side streams being injected into the tubular reactor at side locations along the tubular reactor located at points from about 15 percent to about 85 percent of the distance between the inlet point at which the first stream is introduced and the discharge point at which the polymer and unreacted ethylene mixture is discharged from the tubular reactor, wherein said first stream is ethylene, and wherein said subsequent side stream is a chain transfer agent selected from the group consisting of a saturated aliphatic alcohol containing from 1 to about 10 carbon atoms, a saturated aliphatic ketone containing from 3 to about 10 carbon atoms, a saturated aliphatic aldehyde containing from 1 to about 8 carbon atoms, and an alpha olefin containing from 3 to about 18 carbon atoms, and the total concentration in the polymerizable ethylene reaction mixture of saturated aliphatic alcohol is from about 0.2 to about 10 mole percent, of saturated aliphatic ketone is from about 0.05 to about 10 mole percent, of saturated aliphatic aldehyde is from about 0.02 to about 10 mole percent, and of alpha olefin is from about 0.1 to about 10 mole percent, based on the total flow of ethylene to the reactor.

5. A continuous process for the polymerization of ethylene in a tubular reactor having a length to diameter ratio greater than about 250:1 at a pressure of at least about 15,000 p.s.i.g. and a temperature of from about 90° C. to about 350° C. in the presence of a free radical catalyst to produce normally solid polymers thereof, which comprises introducing a polymerizable ethylene reaction mixture to the tubular reactor in at least two separate streams, the first stream being injected into the tubular reactor at the inlet end of the tubular reactor and the subsequent side streams being injected into the tubular reactor at side locations along the tubular reactor located at points from about 15 percent to about 85 percent of the distance between the inlet point at which the first stream is introduced and the discharge point at which the polymer and unreacted ethylene mixture is discharged from the tubular reactor, wherein said first stream is a mixture of ethylene and a polymerizable ethylenically unsaturated monomer which has a $CH_2=C<$ group and which undergoes addition polymerization, and wherein said subsequent side stream injected into the tubular reactor is a mixture of ethylene and the polymerizable ethylenically unsaturated monomer defined above said ethylenically unsaturated monomer containing from 3 to 18 carbon atoms.

6. A continuous process for the polymerization of ethylene in a tubular reactor having a length to diameter ratio greater than about 250:1 at a pressure of at least about 15,000 p.s.i.g. and a temperature of from about 90° C. to about 350° C. in the presence of a free radical catalyst to produce normally solid polymers thereof, which comprises introducing a polymerizable ethylene reaction mixture to the tubular reactor in at least two separate streams, the first stream being injected into the tubular reactor at the inlet end of the tubular reactor and the subsequent side streams being injected into the tubular reactor at side locations along the tubular reactor located at points from about 15 percent to about 85 percent of the distance between the inlet point at which the first stream is introduced and the discharge point at which the polymer and unreacted ethylene mixture is discharged from the tubular reactor, wherein said first stream is a mixture of ethylene and a polymerizable ethylenically unsaturated monomer which has a $CH_2=C<$ group and which undergoes addition polymerization, and wherein said subsequent side stream injected into the tubular reactor is the polymerizable ethylenically unsaturated monomer defined above said ethylenically unsaturated monomer containing from 3 to 18 carbon atoms.

7. A continuous process for the polymerization of ethylene in a tubular reactor having a length to diameter ratio greater than about 250:1 at a pressure of at least about 15,000 p.s.i.g. and a temperature of from about 90° C. to about 350° C. in the presence of a free radical catalyst to produce normally solid polymers thereof, which comprises introducing a polymerizable ethylene reaction mixture to the tubular reactor in at least two separate streams, the first stream being injected into the tubular reactor at the inlet end of the tubular reactor and the subsequent side streams being injected into the tubular reactor at side locations along the tubular reactor located at points from about 15 percent to about 85 percent of the distance between the inlet point at which the first stream is introduced and the discharge point at which the polymer and unreacted ethylene mixture is discharged from the tubular reactor, wherein said first stream is ethylene, and wherein said subsequent side stream is a mixture of ethylene and a polymerizable ethylenically unsaturated monomer which has a $CH_2=C<$ group and which undergoes addition polymerization said ethylenically unsaturated monomer containing from 3 to 18 carbon atoms.

8. A continuous process for the polymerization of ethylene in a tubular reactor having a length to diameter ratio greater than about 250:1 at a pressure of at least about 15,000 p.s.i.g. and a temperature of from about 90° C. to about 350° C. in the presence of a free radical catalyst to produce normally solid polymers thereof, which comprises introducing a polymerizable ethylene reaction mixture to the tubular reactor in at least two separate streams, the first stream being injected into the tubular reactor at the inlet end of the tubular reactor and the subsequent side streams being injected into the tubular reactor at side locations along the tubular reactor located at points from about 15 percent to about 85 percent of the distance between the inlet point at which the first stream is introduced and the discharge point at which the polymer and unreacted ethylene mixture is discharged from the tubular reactor, wherein said first stream is ethylene and wherein said subsequent side stream is a polymerizable ethylenically unsaturated monomer which has a $CH_2=C<$ group and which undergoes addition polymerization said ethylenically unsaturated monomer containing from 3 to 18 carbon atoms.

References Cited

UNITED STATES PATENTS

| 2,870,130 | 1/1959 | Davison et al. | 260—94.9 |
| 2,894,824 | 7/1959 | Lanning | 260—94.9 |
| 2,951,061 | 8/1960 | Gomory | 260—94.9 |
| 2,964,515 | 12/1960 | Rader | 260—94.9 |

FOREIGN PATENTS

| 471,310 | 2/1951 | Canada. |
| 585,741 | 6/1960 | Belgium. |
| 583,805 | 12/1946 | Britain. |
| 772,890 | 4/1957 | Britain. |

JOSEPH L. SCHOFER, *Primary Examiner.*

L. H. GASTON, *Examiner.*

M. LIERMAN, F. L. DENSON, W. J. VAN BALEN, A. COOKFAIR, *Assistant Examiners.*